(12) United States Patent
Seeley et al.

(10) Patent No.: US 10,268,590 B2
(45) Date of Patent: Apr. 23, 2019

(54) EFFICIENT COMPUTER-IMPLEMENTED TECHNIQUES FOR MANAGING GRAPHICS MEMORY

(71) Applicant: Netflix, Inc., Los Gatos, CA (US)

(72) Inventors: Matthew Seeley, Kamuela, HI (US); Kim Trott, Los Gatos, CA (US); Matthew McCarthy, Los Gatos, CA (US); Dylan Oudyk, Los Gatos, CA (US); Sam Magnuson, Los Gatos, CA (US); Jan Hanssen, Los Gatos, CA (US)

(73) Assignee: NETFLIX, INC., Los Gatos, CA (US)

( * ) Notice: Subject to any disclaimer, the term of this patent is extended or adjusted under 35 U.S.C. 154(b) by 165 days.

(21) Appl. No.: 15/049,986

(22) Filed: Feb. 22, 2016

(65) Prior Publication Data

US 2016/0247252 A1   Aug. 25, 2016

Related U.S. Application Data

(60) Provisional application No. 62/119,746, filed on Feb. 23, 2015, provisional application No. 62/119,747, filed on Feb. 23, 2015.

(51) Int. Cl.
*G06T 1/60* (2006.01)
*G06F 12/08* (2016.01)
(Continued)

(52) U.S. Cl.
CPC ...... *G06F 12/0875* (2013.01); *G06F 12/0207* (2013.01); *G06F 12/123* (2013.01);
(Continued)

(58) Field of Classification Search
None
See application file for complete search history.

(56) References Cited

U.S. PATENT DOCUMENTS

| 6,073,076 | A | * | 6/2000 | Crowley | ............... G01C 21/26 |
| | | | | | 701/400 |
| 2006/0103654 | A1 | * | 5/2006 | Chik | ..................... G06F 17/214 |
| | | | | | 345/467 |

(Continued)

*Primary Examiner* — Tize Ma
(74) *Attorney, Agent, or Firm* — Artegis Law Group, LLP

(57) ABSTRACT

In an embodiment, a data processing method provides an improvement in efficient use of computer memory and comprises using a computer, creating in computer memory a glyph memory area that is configured to store a plurality of cached glyphs; using the computer, receiving a request from an application to use a particular glyph; in response to the request, determining whether the particular glyph is in the glyph memory area; in response to determining that the particular glyph is not in the glyph memory area: attempting to store a bitmap of the particular glyph to a next location in the glyph memory area; in response to determining that the next location is not available a first time, reclaiming space in the glyph memory area in an amount sufficient to store the bitmap; attempting a second time to store the bitmap in the next location in the glyph memory area; in response to determining that the next location is not available a second time, clearing the glyph memory area of all previously stored glyphs and storing the bitmap in the glyph memory area.

18 Claims, 9 Drawing Sheets

(51) Int. Cl.
*G06F 17/30* (2006.01)
*G06F 12/0875* (2016.01)
*G06F 12/02* (2006.01)
*G06F 12/123* (2016.01)
*H04N 19/46* (2014.01)
*H04N 19/423* (2014.01)

(52) U.S. Cl.
CPC ...... *G06F 2212/455* (2013.01); *H04N 19/423* (2014.11); *H04N 19/46* (2014.11)

(56) References Cited

U.S. PATENT DOCUMENTS

| | | | |
|---|---|---|---|
| 2007/0124474 A1* | 5/2007 | Margulis | G06F 3/14 709/226 |
| 2008/0016295 A1* | 1/2008 | Yim | G06F 11/2082 711/156 |
| 2011/0043528 A1* | 2/2011 | Solomonov | G09G 5/222 345/467 |
| 2016/0078655 A1* | 3/2016 | Cohen | G06K 9/18 345/468 |

* cited by examiner

… (1) …

EFFICIENT COMPUTER-IMPLEMENTED TECHNIQUES FOR MANAGING GRAPHICS MEMORY

BENEFIT CLAIM

This application claims the benefit under 35 USC § 119(e) of provisional applications 62/119,746, filed Feb. 23, 2015, and 62/119,747, filed Feb. 23, 2015, the entire contents of which are hereby incorporated by reference for all purposes as if fully set forth herein. The applicant(s) hereby rescind any disclaimer of claim scope in the provisional applications and advise the USPTO that the claims in this application may be broader than any claim in the provisional applications.

FIELD OF THE DISCLOSURE

The present disclosure generally relates to computer-implemented techniques for manipulating and displaying digitally stored graphical images. The disclosure relates more specifically to glyph caching, surface caching, surface atlases, and efficient display of large numbers of graphical images.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Computer services, applications and systems that are configured to display large numbers of graphical images to large numbers of client computers must offer high performance in order to deliver the best user experience. For example, certain kinds of audiovisual program services are configured to display graphical images representing movies, TV shows, or other items that are available for viewing. When these services offer thousands of items, and have millions of subscribers, efficient techniques for delivering millions of copies of the graphical images to client computers are needed.

A related problem involves displaying electronic documents, web pages or other graphical content that include text formed using stored graphical elements termed glyphs. A glyph may be a character or pictogram of an alphabet or character set that can be used to form words, phrases or sentences. Although the total number of glyphs is typically small—for example, a standard Roman alphabet has 26 letters that may correspond to 26 glyphs—online systems of the type described above may need to deliver particular glyphs millions of times to different clients as part of computer displays that the systems generate. Thus, there is a need for techniques to efficiently deliver glyphs from computer storage to the display units of the client computers.

SUMMARY

The appended claims may serve as a summary of the invention.

DETAILED DESCRIPTION

Figure 1:
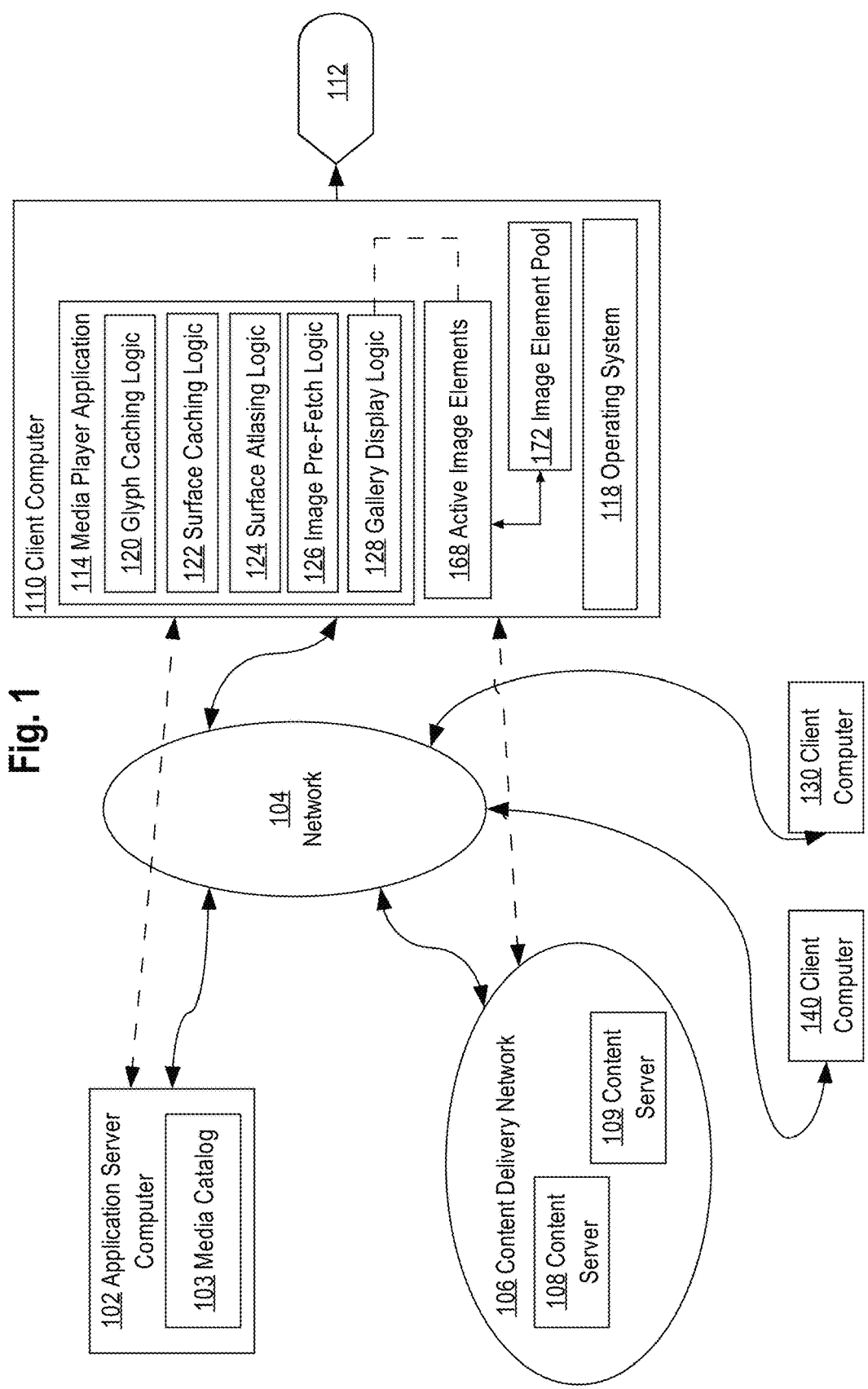
FIG. 1 illustrates a networked computer system with which an embodiment may be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described in sections below according to the following outline:

1. Overview
2. Glyph Caching Techniques
3. Surface Atlasing Techniques
4. Surface Caching Techniques
5. Image Display and Pre-Fetch Techniques
6. Example Implementation Mechanism—Hardware Overview
7. Extensions and Alternatives 1. Overview A computer application, such as a media player, may request textual characters, graphical surfaces, images, textures or other visual content to be displayed on a screen of a computer on which the application runs. To do so, the application may invoke calls, through an operating system or directly, to one or more processing units to convert the requested visual content item into a bitmap which, perhaps after additional processing, can be written to the screen of the computer and cause a display of the visual content item. In order to accelerate the conversion of a visual content item into a corresponding bitmap, in an embodiment, the computer creates and maintains a memory space for bitmaps and metadata of visual content items. Accordingly, once a particular visual content item is stored as a bitmap in the memory space, when the application requests the display of the particular visual content item, the computer may directly retrieve the bitmap stored in the memory space, rather than download, decode, transform, render and/or perform other visual content processing operations for the particular visual content item. To maximize advantages of storing visual content items in memory spaces, various techniques are described herein to efficiently store and quickly access visual content items from a memory space. These techniques may result in increase of the responsiveness of the application and decrease computing resources consumed to display visual content items.

In an embodiment, a data processing method provides an improvement in efficient use of computer memory and comprises using a computer, creating in computer memory a glyph memory area that is configured to store a plurality of cached glyphs; using the computer, receiving a request from an application to use a particular glyph; in response to the request, determining whether the particular glyph is in the glyph memory area; in response to determining that the particular glyph is not in the glyph memory area: attempting to store a bitmap of the particular glyph to a next location in the glyph memory area; in response to determining that the next location is not available a first time, reclaiming space in the glyph memory area in an amount sufficient to store the bitmap; attempting a second time to store the bitmap in the next location in the glyph memory area; in response to determining that the next location is not available a second time, clearing the glyph memory area of all previously stored glyphs and storing the bitmap in the glyph memory area.

In an embodiment, a data processing method comprises using a computer, creating and storing, in computer memory, one or more first rows of visible image elements and one or more second rows of non-visible image elements; causing displaying, in a graphical user interface, graphical images corresponding to the one or more first rows of visible image elements; receiving input specifying a scrolling operation that involves moving at least a portion of one of the second rows of non-visible image elements into visible position; causing displaying animated movement of the one or more first rows of visible images and the one or more second rows based upon the input; during the displaying the animated movement, for the non-visible image elements, refraining from performing one or more of downloading, decoding, rendering or displaying images corresponding to the non-visible image elements, and displaying one or more placeholder images in newly visible positions corresponding to the non-visible image elements; detecting a pause in the input specifying a scrolling operation; in response to the detecting, performing one or more of downloading, decoding, rendering or displaying rendered images corresponding to the non-visible image elements, and displaying the rendered images in the newly visible positions; wherein the method is performed by one or more special-purpose computing devices.

FIG. 1 illustrates a networked computer system with which an embodiment may be implemented. In one approach, an application server computer 102 is coupled to a network 104, which is also coupled to a content delivery network (CDN) 106 and client computers 110, 130, 140. For purposes of illustrating a clear example, FIG. 1 shows a limited number of elements, but in practical embodiments there may be any number of certain elements shown in FIG. 1. For example, application server 102 may represent an instance among a large plurality of instances of the application server in a data center, cloud computing environment, or other mass computing environment. There may be multiple CDNs and there may be thousands or millions of client computers.

In an embodiment, application server computer 102 hosts a media catalog 103 that contains metadata relating to a plurality of movies, TV programs, or other audiovisual items that may be delivered by streaming or otherwise to the client computers 110, 130, 140 from CDN 106. The CDN 106 comprises a plurality of content servers 108, 109 that hold copies of assets associated with the audiovisual items, such as digitized versions of the audiovisual items prepared using a variety of different encodings and/or formats. Network 104 broadly represents one or more local area networks, wide area networks, internetworks, or a combination thereof.

Each of the client computers 110, 130, 140 comprises a computing device having a central processing unit (CPU), graphics processing unit (GPU), one or more buses, memory organized as volatile and/or nonvolatile storage, one or more data input devices, I/O interfaces and output devices such as loudspeakers or a LINE-OUT jack and associated drivers. Each of the client computers 110, 130, 140 is coupled to a separate display unit 112 such as a computer screen, TV screen or other display. Client computers 110, 130, 140 may comprise any of mobile or stationary computers including desktop computers, laptops, netbooks, ultrabooks, tablet computers, smartphones, etc. Typically the GPU and CPU each manage separate hardware memory spaces. For example, CPU memory may be used primarily for storing program instructions and data associated with application programs, whereas GPU memory may have a high-speed bus connection to the GPU and may be directly mapped to row/column drivers or driver circuits associated with a liquid crystal display (LCD) that serves as the display 112.

Each of the client computers 110, 130, 140 hosts, in an embodiment, a media player application 114 running on an operating system 118 and comprising glyph caching logic 120, surface caching logic 122, surface atlasing logic 124, and image pre-fetch logic 126. In an embodiment, media player application 114 is configured to establish a connection to application server computer 102, access the media catalog 103, and provide a display of graphical images representing available and/or recommended audiovisual items to the client computer 110. In an embodiment, application server 102 may maintain a plurality of accounts, each associated with one of the client computers 110, 130, 140 and/or one or more users of the client computers. Accounts may include profiles of multiple different users in a household who use the same client computer 110, 130, 140 to access the application server computer 102.

In this arrangement, client computer 110 may select a particular audiovisual item for viewing, receive from the application server computer 102 a location identifier of a particular content server 108 that hosts copies of assets for the particular audiovisual item, request the particular audiovisual item from the particular content server, and receive streaming media delivery of one of the assets for display on the display unit 112. Thus, the media player application 114 on client computer 110 serves as a means of accessing the media catalog 103 and assets held on the content servers 108, 109; the media player application may integrate many features and functions, such as recommendations, lists of queued items to play, social interaction with friends of a user of the client computer, display of metadata relating to audiovisual items, and many other functions other than only playing audiovisual items.

In an embodiment, the glyph caching logic 120 is configured to support operation of the media player application 114 by efficiently obtaining, managing and displaying glyphs as part of the displays that the media player application generates, using the techniques further described herein. In an embodiment, the surface caching logic 122 is configured to support operation of the media player application 114 by efficiently obtaining, managing and displaying graphic images that are organized as surfaces using the techniques further described herein; examples of surfaces include images representing particular audiovisual items, sometimes termed box art. In an embodiment, surface atlasing logic 124 is configured to support operation of the media player application 114 by efficiently storing and managing the storage of surfaces, using the techniques further described herein. In an embodiment, image pre-fetch logic 126 is configured to support operation of the media player application 114 by efficiently displaying box art or other images as part of media catalog displays, particular during scrolling or other display operations, using the techniques further described herein.

In one approach, the media player application 114 may be viewed as a client of the glyph caching logic 120, surface caching logic 122, surface atlasing logic 124, and image pre-fetch logic 126. For example, the glyph caching logic 120, surface caching logic 122, surface atlasing logic 124, and image pre-fetch logic 126 may be implemented as independent callable methods or processes that provide services, and the media player application 114 may be principally responsible for generating a graphical user interface on the client computer 110 and calling services as needed from the logical elements.

Further, glyph caching logic 120, surface caching logic 122, surface atlasing logic 124, and image pre-fetch logic 126 may be supported by a graphic image processing library and/or font library, which may be implemented using commercial products or open source projects. For example, in one embodiment the client computer 110 also hosts an implementation of the FREETYPE project, a view system such as OPENGL, and/or other libraries or projects, which implement graphics primitive operations and/or interact directly with a graphics processing unit (GPU) of client computer 110. For purposes of illustrating clear examples, certain sections herein refer to using FREETYPE calls and OPENGL structures, but other embodiments may interoperate in a functionally similar manner with other font systems and graphics primitives.

2. Glyph Caching Techniques

Figure 2:
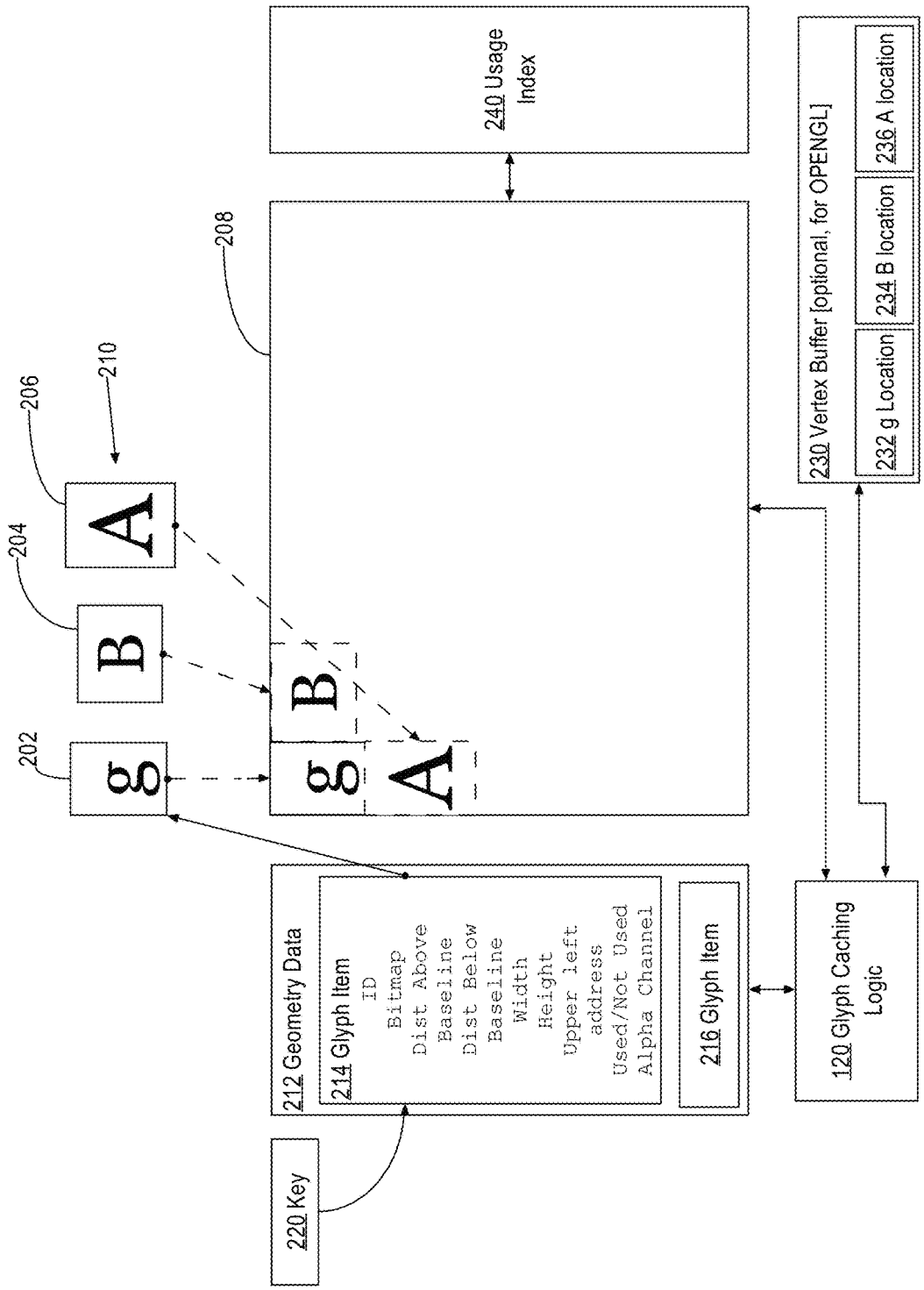
FIG. 2 illustrates data structures, memory organization and other aspects of glyph caching according to an embodiment.
Figure 3:
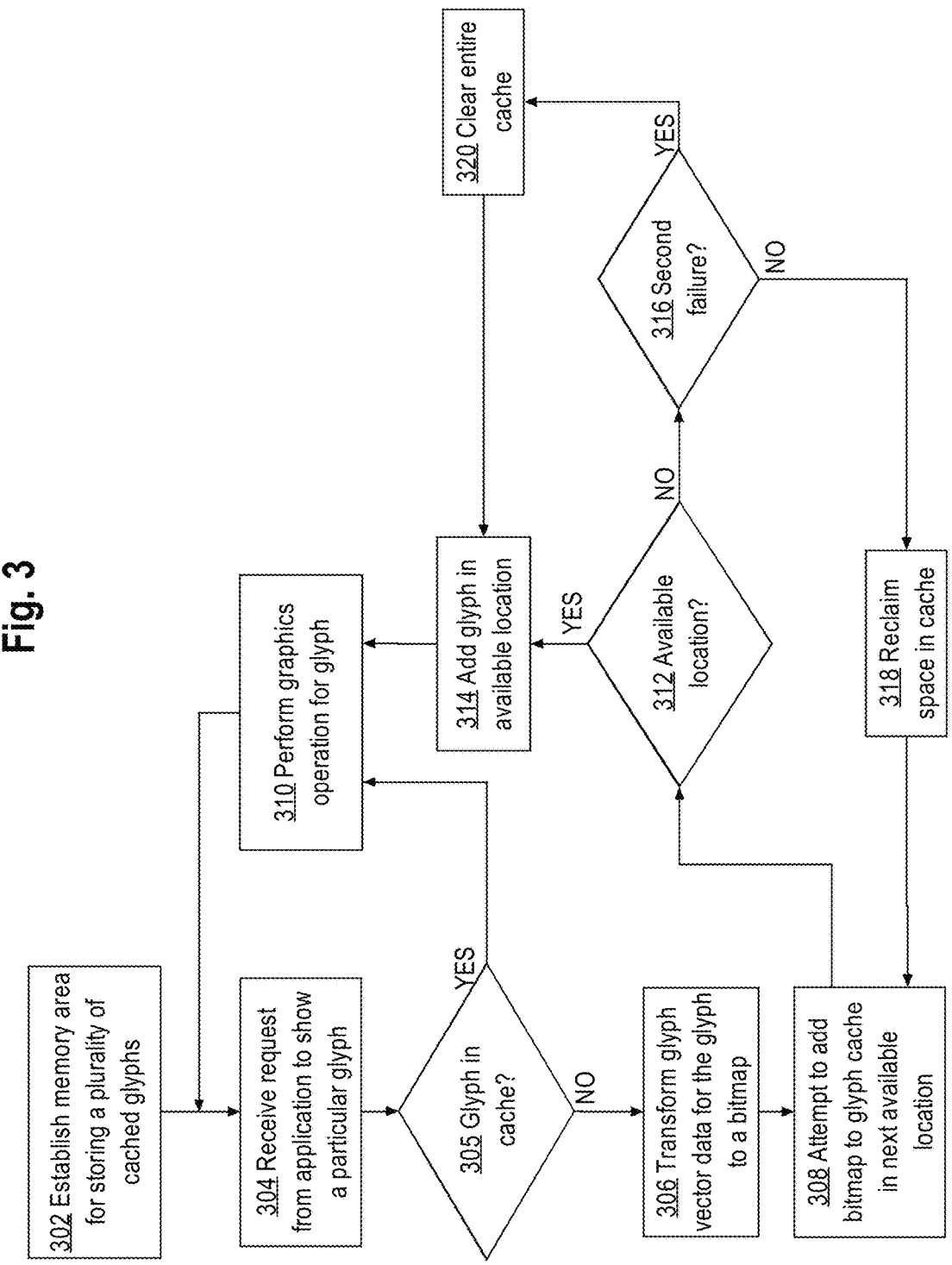
FIG. 3 illustrates a process of managing a glyph cache, in one embodiment.

FIG. 2 illustrates data structures, memory organization and other aspects of glyph caching according to an embodiment. FIG. 3 illustrates a process of managing a glyph cache, in one embodiment.

Referring first to FIG. 2, in an embodiment, computer memory at client computer 110 may be organized using a glyph cache 208 that is coupled to or accessible using the glyph caching logic 120. In an embodiment, glyph caching logic 120 also is coupled to geometry data 212 and a glyph vector 210, which may be implemented using data structures in computer memory of client computer 110. In general, the glyph cache 208 comprises a finite memory space that is used to store copies of a finite number of glyphs as the media player application 114 requests the glyphs for display as part of GUI elements of displays that the application generates. Thus, the glyph cache 208 may serve as an atlas of glyphs for use by requesting applications. Preferably the glyph cache 208 is allocated in memory that is managed by the GPU, rather than by the central processing unit (CPU) of the client computer 110.

The glyph vector 210 comprises a stored list of bitmaps of all glyphs that are defined for a particular character set; for example, glyphs 202, 204, 206 may comprise bitmaps of different characters of a character set. Glyph vector 210 may comprise vector format data for a font or characters within a font and may include other data necessary for rendering text into glyphs for display; for example, TRUETYPE font data may be used.

Geometry data 212 comprises a plurality of glyph items 214, 216, each of which comprises a set of metadata for a particular glyph 202, 204, 206 and is indexed using a distinct key 220. Large numbers of keys, such as key 220, may be cached in a dedicated cache for fast access to metadata about glyphs. For purposes of illustrating a clear example, FIG. 2 shows two glyph items 214, 216 but in a practical embodiment there may be any number of glyph items in the geometry data 212. Further, to show a clear example, FIG. 2 shows geometry data 212 and glyph cache 208 as separate units, but in some embodiments, both the geometry data and glyphs may be cached in a single memory address space and managed as a unified cache; this approach would permit, for example, rapid access to baseline data and other metadata contained in glyph items 214, 216. As a specific example, obtaining width and height data could be obtained from the cache without requiring a FREETYPE call to access the vector 210 or other stored font data. Alternatively, even if a FREETYPE call is issued, the FREETYPE operation to render text may result in access to glyph cache 208 rather than re-loading and re-processing TRUETYPE font data from persistent storage. In one approach, when glyphs 202, 204, 206 are added to or removed from cache 208, geometry data 212 for corresponding glyph items 214, 216 is concurrently updated in the same memory space; that is, glyphs and related data may stand or fall in the cache together. Alternatively, metadata and glyphs are independent and the cache may store geometry data 212 for a particular glyph 202, 204, 206 without having that glyph in the cache 208.

For purposes of illustrating a clear example, FIG. 2 shows a single glyph cache 208. However, there may be a plurality of glyph caches 208, each cache corresponding to a particular character set or font family.

In one embodiment, each glyph item 214, 216 comprises values for: glyph identifier, which may correspond to key 220; a distance above baseline; a distance below baseline; a width; a height; an upper left address; a used/not used flag; alpha channel values. Glyph items, such as glyph item 214, may include bitmaps of the corresponding glyphs in addition or alternative to the glyphs being stored in glyph cache 208. In an embodiment, the distance above baseline value indicates a number of pixels that the associated glyph extends above a baseline that is defined for the font to which the glyph belongs, and the distance below baseline value is a number of pixels that the glyph extends below the baseline. As an example, in a typical Roman character set the letter "A" has a distance below baseline value of zero (or a small number) since the letter is displayed at or just above the baseline, whereas the letter "g" has a non-zero value for distance below baseline because the descender portion is displayed below the baseline of all other characters. The width value indicates a width of the glyph in pixels and each glyph may have a different width value. The height value indicates a height of the glyph in pixels and each glyph may have a different height value.

The upper left address value indicates a memory location in the glyph cache 208 at which an upper left pixel of the glyph bitmap data begins. Additionally or alternatively, the system may maintain a separate mapping of keys to memory locations. Accordingly, it is unnecessary to traverse geometry data 212 to access glyphs in glyph cache 208, rather the mapping of keys to memory locations may be used to access the glyphs.

The used/not used flag indicates whether the associated glyph is currently used in a GUI display of the media player application 114; as further described, a value of NOT USED may be used as the basis of defragmentation, deletion, or other memory recapture or re-use operations associated with glyph cache 208. The alpha channel value may be from 0 to 1 and represent opacity of the glyph and may also include anti-aliasing data.

A usage index 240 may be associated with glyph cache 208 and may store cache occupancy or availability data, or a combination, indicating which locations in the cache are occupied by glyphs and/or which locations are available to accept new glyphs. For example, usage index 240 may comprise a plurality of entries, each entry indicating a range of bytes that are in use for a glyph, and/or a set of upper-left address values in association with height values and width values. In effect the usage index 240 may comprise a series of pointers to in-use portions of the cache 208. The particular structure or format of data in the usage index 240 is not critical provided that the index provides a way to rapidly determine what space in the glyph cache 208 is actually occupied or free, without having to access data in the cache itself.

The foregoing format of metadata is merely one example, and fonts or glyphs used on different hardware platforms comprising the client computers 110, 130, 140 may used different sets of metadata and/or different data formats. For example, metadata might include RGBA data, full pixel fonts, etc.

Glyph caching logic 120 may implement the process of FIG. 3. In an embodiment, at block 302, the process establishes a memory area for storing a plurality of cached glyphs. For example, the glyph cache 208 is allocated in memory using a memory allocation operation of the operating system 118 and a specified size. In one implementation, glyph cache 208 is 1024 bytes by 1024 bytes, but other sizes may be used in other embodiments. This size will accommodate a large number of glyphs, which typically comprise bitmaps of roughly 30×30 bytes for non-Asian alphabets. The size of the glyph cache 208 may be a configurable value that can be changed based upon a configuration file or other setting. Note that the memory within the glyph cache 208 is initially empty and is not pre-populated before applications need to use glyphs.

At block 304, the process receives a request from an application to show a particular glyph. For example, the media player application 114 sends a request to glyph caching logic 120 to display a particular character in a particular font. Block 304, followed by other blocks of FIG. 3, are intended to clarify that the process of FIG. 3 is dynamic and performed on-demand in response to applications that need to display fonts, characters, strings, phrases or sentences, so that the glyph cache 208 is not prepared in advance for later use by the applications.

At block 305, the process tests whether the requested glyph is already in the glyph cache. Evaluation of the test of block 305 may involve performing a lookup in the geometry data 212 to determine if the glyph is in use. If so, then at block 310 the process performs a graphics operation for the glyph. Block 310 broadly represents instructing the GPU to blit the glyph to the screen; performing colorization operation based on the alpha channel data in the geometry data 212 and color values obtained from the vector 210 or other sources; instructing the GPU to perform a direct memory copy from the glyph cache 208 to a location in display memory that the application has specified; returning the bitmap of the glyph from the cache to the requesting application; or other operations. In some cases, as a result, when a requested glyph is in the cache, the glyph can be immediately displayed without a transformation operation, because the transformation operation was already performed to place the glyph in the cache.

If the test of block 305 is negative, then in response, at block 306, the process causes transforming glyph vector data into a bitmap. For example, block 306 may involve issuing a FREETYPE call to cause transforming vector data for glyph 202 into a bitmap representation. For purposes of clarity, FIG. 3 omits certain preparatory steps that may be used as a matter of completeness in an implementation. For example, in one embodiment, if necessary block 306 or other blocks within FIG. 3 may include requesting loading a TRUETYPE font and requesting the font or a font library to return a set of glyphs for a certain font size. The computational cost of performing block 306 is relatively high, and therefore embodiments herein are configured to minimize the number of times that such vector transformations to bitmaps are needed.

At block 308, the process attempts to add the resulting bitmap dynamically to the glyph cache in the next available location. Attempting to add a bitmap to the cache may comprise inspecting the usage index 240 to determine which locations in cache 208 are available or occupied. At block 312, the process tests whether any of the available locations will accept the glyph.

In an embodiment, the location of the subject glyph is determined based on properties of recently added glyphs. The test of block 312 may be performed by comparing width and height values of the subject glyph to width and height values of two or more glyphs that were most recently added to the cache. For example, assume that glyph 202 was added to cache 208 as seen in FIG. 2. If the next glyph 204 to be added has a width greater than the width of glyph 202, then the next glyph 204 is added to the right of glyph 202. However, if the next glyph 206 to be added has a height greater than the height of glyph 202, then the next glyph 206 is added directly below glyph 202. This approach maximizes efficient use of memory. These logical rules may be implemented in a packer method or object that is called from the glyph caching logic 120, or may be implemented within that logic.

In some embodiments, the next available location is selected to leave a 1-pixel gap between adjacent glyphs, which has been found beneficial in the case of rendering using OPENGL in which rounding error and other inaccuracies in floating-point operations require such padding space to prevent font overlaps. Implementations that do not use OPENGL may not need to use such padding.

If a location is available using the foregoing logic, then at block 314, the glyph is added in that location. Geometry data 212 also is updated to reflect the location at which the corresponding glyph was actually stored by updating the upper left address value.

However, the foregoing logic may result in determining that the correct next position for the current glyph is not available in cache 208 because the cache already holds too many other glyphs. If this occurs, then in block 316, the process tests whether the failure to find an available location is the first or second failure. If it is the first failure, then in block 318, the process reclaims a portion of space in the cache. In one embodiment, reclaiming space comprises deleting all glyphs that are in a specified amount of the cache 208, such as the 30% of the memory that comprises the cache and is associated with UNUSED glyphs in the geometry data 212. The value 30% is not critical and other values or amounts may be used in other embodiments.

Additionally or alternatively, reclaiming space may comprise performing defragmentation of the cache 208 by rewriting certain glyphs into new positions that have become available after removal of non-used glyphs. For example, rather than deleting everything in the lower 30% of memory, the reclamation operation may comprise deleting only those glyphs that are in the cache 208 but marked as UNUSED in the geometry data 212, then repacking the USED glyphs into new positions based upon availability. Additionally or alternatively, rather than relying upon the USED/UNUSED flag in the geometry data 212, the process may maintain a list of glyph identifiers in order of most recently used or priority, and may use the list to determine which glyphs to delete from the cache or which memory areas to reclaim.

If the test of block 316 is true so that the failure to find an available location is the second failure, then at block 320, the process completely clears the cache and then stores the subject glyph in the first available location, as represented in FIG. 3 by the path from block 320 to block 314. That is, when an iteration fails for the second time, the process clears the entire cache and starts rebuilding the cache as the application requests the use of glyphs.

In one embodiment, if a particular glyph is to be rendered using a visible outline, the outline is treated as a separate glyph, so that the outline is requested from the font, transformed to a separate bitmap, and stored in glyph cache 208 in a position separate from a character that is to be outlined. In other words, outlined characters are not stored in unitary fashion in the glyph cache 208, but a plain character is stored in one location in the cache and an outline for the character is stored in another location.

Using these approaches, the glyph cache 208 is constructed and maintained dynamically in response to requests of applications to display glyphs, rather than in advance. The dynamic construction approach described here is beneficial in cases in which it is not possible to predict in advance which character set will be used, or which characters within that set will be needed for an application to render a dynamically generated computer screen display. In the approaches herein, requests of applications to cause displaying glyphs can be satisfied by fast memory copy operations that move a portion of the cache 208 corresponding to a glyph bitmap from GPU memory to GPU registers for display processing; repeated invocation of transformations from vector data to bitmaps are avoided, greatly improving computational and processing efficiency. This approach precludes the need to repeatedly convert font elements from vector format to bitmaps in every frame of rendering, and also avoids relatively costly memory copy operations that move data from CPU memory to GPU memory. These approaches therefore are expected to reduce the time needed to display glyphs and related words, phrases or sentences in high-speed graphics-heavy applications that serve large numbers of client computers.

Still another benefit is that the present approaches can reduce the number of calls to GPU primitive operations that need to be performed. For many GPUs, a single function call can be used to perform operations for multiple glyphs when the source location is the same. In the present approaches, the glyph cache 208 serves as a single source that can be referenced in a single call to process multiple different glyphs. For example, assume that the application needs to render the word HELLO on the display screen and the cache 208 contains glyphs for H, E, L, O. A single GPU function call may be used, referencing the cache 208 once and the four (4) locations within cache 208 of the glyphs for H, E, L, L, O, to request the GPU to batch blit all five (5) characters contiguously to the screen. In contrast, with some prior approaches, batch blit operations could not have been performed and five (5) blit calls could have been required, each referencing a different source for the constituent glyphs.

As a further optimization, in implementations that use OPENGL, the system may cache an OPENGL vertex buffer 230 that contains locations, within glyph cache 208, of sets of glyphs that are expected to be reused. As one example, in FIG. 2 vertex buffer 230 contains location data 232, 234, 236 corresponding to locations in glyph cache 208 for glyphs 202, 204, 206. As another example, a cached OPENGL vertex buffer could contain location data in glyph cache 208 for the sequence of glyphs H, E, L, L, O. Thereafter, when the application requests rendering the word HELLO to the screen again, for example, the system may provide the GPU with a single instruction that references the particular vertex buffer that contains glyph location data for HELLO. In response, the GPU will directly access the glyph cache 208 iteratively for each glyph identified in the vertex buffer and blit each particular glyph to the screen. This approach can eliminate the need to form and send the GPU a plurality of different blit instructions for individual characters of a word or phrase.

3. Surface Atlasing Techniques

Figure 4:
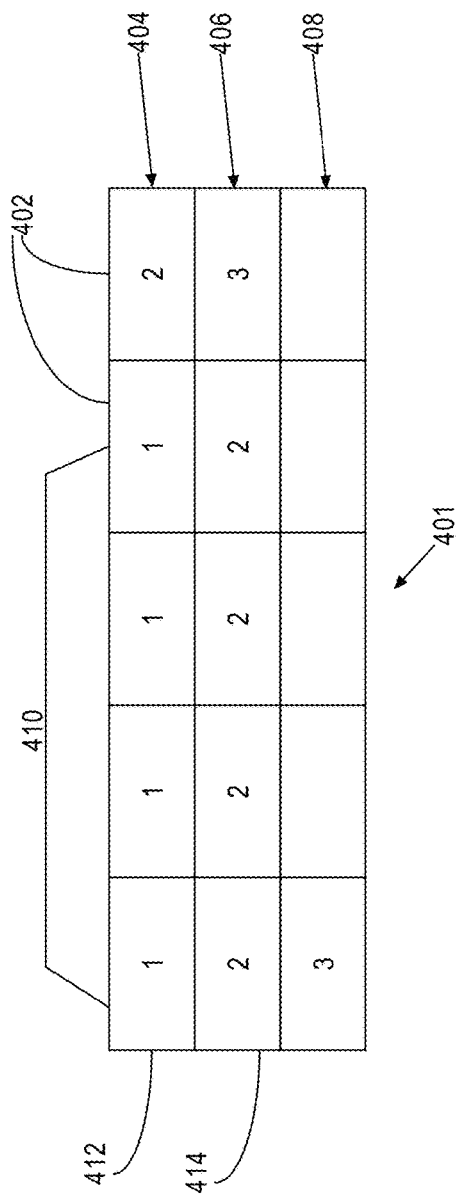
FIG. 4 illustrates an example computer memory space configured to store a plurality of atlases of graphical surfaces.

FIG. 4 illustrates an example computer memory space configured to store a plurality of atlases of graphical surfaces. In an embodiment, the elements of FIG. 4 are created and managed by the surface atlasing logic 124 in the manner described herein in subsequent sections.

In the example of FIG. 4, a memory space 401 comprises a plurality of memory units 402 each representing an array of bytes corresponding to a graphical image having fixed dimensions of length and width. In one approach, the techniques of FIG. 4 are optimized for use with graphical images that are rectangular with predictable or known dimensions, such as graphical images of box art pertaining to audiovisual recordings. Thus each memory unit 402 typically comprises complete bitmap data including color information for a particular item of box art or another kind of graphical image.

In the example of FIG. 4, memory space 401 comprises rows 404, 406, 408 each having five (5) memory units 402. In an embodiment, each of the rows 404, 406, 408 corresponds to all the box art images that are displayed in a particular row of a graphical user interface on the display device of an end user. Particular examples of such GUI screens are described further herein in other sections.

In an embodiment, the surface atlasing logic 124 of media player application 114 may declare one or more visual content items, such as graphical images, and associated memory units 402 as part of a particular surface atlas group. Thus the memory units 402 may be organized as a plurality of surface atlas groups. Each surface atlas group, or "atlas," may be stored in a finite memory size of fixed and specified size, such as the same size as for the glyph cache described herein for FIG. 2. In an embodiment, media player application 114 may declare the fixed size of the graphical images and the size of each atlas. GPU may treat an atlas group as a single image for visual content processing operations, significantly reducing computing resources necessary for executing the operations. For example, in an embodiment that is based on OPENGL, each atlas is implemented as a texture.

The surface atlas groups may or may not correspond to rows of the memory space 401 and therefore may or may not correspond to rows of images that are capable of display in a row-oriented user interface. For example, a first surface atlas group 410 comprises four (4) memory units identified with number "1", a second surface atlas group has five (5) units identified with number "2", and a third surface atlas group has two (2) units identified with number "3". Metadata indicating an identifier of a surface atlas group associated with an image may be stored in geometry data of the type described herein for glyphs. Alternatively, an embodiment may maintain an LRU list of surfaces, ordered by least recently used (LRU) memory unit, and the atlas identifier may be stored in an entry of the LRU list along with data identifying the LRU unit.

Memory organized in this manner permits more rapid graphical transfer operations, uses less memory by implementing efficient reclamation and referencing approaches, and reduces the number of texture operations that would be required otherwise. For example, in response to the media player application 114 requesting to display a row of box art images in a GUI that is configured to show recommendations, lists, queues or other associations of audiovisual programs, the surface atlasing logic 124 may be configured to batch blit all memory units 402 of a particular surface atlas group 410 to the display screen. Thus, a single GPU operation can be used with a reference to a single memory space 401, and the four (4) units 402 within a particular surface atlas group 410 in that space, greatly reducing the number of GPU cycles required to write all the units of a surface atlas group 410 to the screen. Moreover, to support the appearance of scrolling operations in the GUI, the surface atlasing logic 124 may issue animation instructions to the GPU that reference the single memory space and a group of memory units 402 that correspond to the particular surface atlas group 410; as a result, fast scroll operations may be permitted in an environment in which users typically regularly and rapidly scroll large lists of graphical items around the screen as part of catalog browsing operations. For example, an instruction may instruct the GPU to offset all items in the surface atlas group 410 by "20" pixels and in response the GPU will perform a batch memory copy operation to accomplish the shift. Repeated use of such operations can produce animated effects and scrolling.

In some embodiments, the elements of a surface atlas group 410 may correspond to particular rows or visible rows of the GUI. When all elements of a first surface atlas group 410 are presently displayed on the screen of the end user GUI and the media player application 114 needs to add other images to visible positions of the GUI, the surface atlasing logic 124 may add the new images to the same surface atlas group 410 having label "1". A surface atlas group 410 may expand dynamically in this manner until the specified memory size for the surface atlas group is full. At that point, if the media player application 114 requests adding another image to the visible portion of the GUI and all other images must be retained because the other images are also visible, in response, the surface atlasing logic 124 may form a new surface atlas group having a different surface atlas group identifier, such as "2" in the example of FIG. 4. Forming a new surface atlas group may require a new memory allocation operation to allocate memory in the specified amount for use for the new surface atlas group.

Similarly, if a particular image in a particular surface atlas group enters a non-visible region of display space, then the surface atlasing logic 124 may remove that image from the surface atlas group 410. The surface atlasing logic 124 also may implement reclamation logic that is triggered based on various thresholds. For example, in one embodiment when the surface atlasing logic 124 determines that 20% or less of the memory space of a particular surface atlas group is associated with images that are then currently visible on screen, the surface atlasing logic may purge the entire surface atlas group in order to reclaim the memory space associated with the surface atlas group. If the remaining images in that surface atlas group are needed for display then the surface atlasing logic 124 may rebuild a new surface atlas group for those images as they are required by the media player application 114. In other embodiments, a threshold for reclaiming memory from an atlas group may be based on a particular number or total size of non-visible images in the surface atlas. The threshold may be configurable by an application such as a media player.

In an embodiment, surface atlasing logic 124 implements duplicate image detection logic. For example, assume that a particular memory unit 412 associated with surface atlas group "1" is for the graphic image file FOO.png. Assume now that media player application 114 performs operations that request using the same graphic image FOO.png as part of a different surface atlas group "2." In response, surface atlasing logic is configured not to retrieve a second copy of FOO.png from networked storage or to request transformation to a bitmap, since a bitmap for that image was already obtained when the image was associated with surface atlas group "1". Instead, geometry data or other storage may reflect a reference to the prior bitmap of FOO.png. This procedure can improve the efficiency of retrieval, storage and display operations when a particular image is requested multiple times for display in the GUI.

In a related procedure, in an embodiment, surface atlasing logic 124 is configured to manage multiple atlases to handle orphan references to graphic images. For example, assume now that all the images of surface atlas group "1" have scrolled off-screen in the GUI, so that surface atlas group "2" remains valid with visible images, but FOO.png is no longer displayed in the position that was associated with surface atlas group "1". In this case, the only reason for retaining storage of surface atlas group "1" is to prevent the loss of image data that is referenced in surface atlas group "2". In this case, in response, surface atlasing logic 124 is configured to transfer the bitmap data for FOO.png to surface atlas group "2" and to reclaim all storage associated with atlas group "1". This approach ensures that the system does not waste storage maintaining surface atlas groups that are associated entirely with non-displayed images, yet hold source data that was retrieved for the benefit of surface atlas groups and therefore retains usefulness. As a result, far more GPU memory is available for other uses.

4. Surface Caching Techniques

Figure 5:
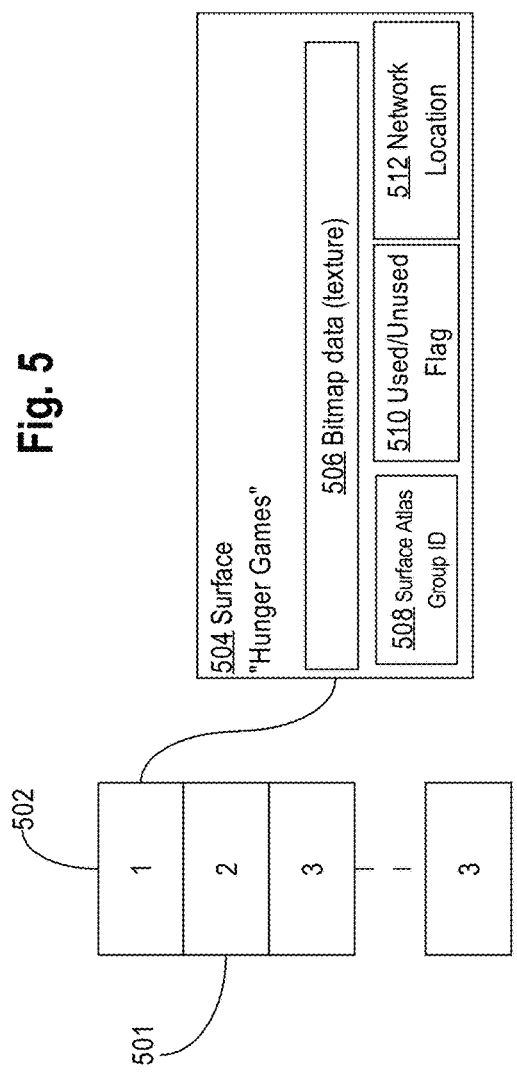
FIG. 5 illustrates data structures that may be used to support computer-implemented surface caching.

FIG. 5 illustrates data structures that may be used to support computer-implemented surface caching. In an embodiment, the surface cache 401 may be an LRU list 502 that comprises data identifying a plurality of surface items 501 in least recently used order. Any number of surfaces may be associated in the LRU list 502. For example, a first surface item in the LRU list may comprise surface 504 which comprise graphical image bitmap data 506, a surface atlas group ID 508, a USED/UNUSED flag 510 and a network location value 512. The graphical image bitmap data 506 may comprise a rendered texture that is available to blit to a screen for use by an application; for example a surface might comprise box art for the program "Hunger Games." Surface atlas group ID 508 identifies a surface atlas group to which the item belongs, as described in the previous section. The USED/UNUSED flag 510 indicates whether the item is then currently in-use by an application, for example, displayed in a screen display in a visible position, and serves as an indicator about whether the item should be retained or reclaimed, as further described herein. The network location value 512 indicates a location at which a source file for the rendered texture may be found; for example, the location may be indicated using a URL that includes a path that terminates with a filename for the image such as FOO.png.

In an embodiment, as surfaces are rendered to the GUI, the surfaces are reordered in LRU list 502. The surfaces may be re-ordered by updating LRU list entries' sequence identifiers that indicate the positions of the LRU entries according to the order of the LRU list.

In one particular implementation, the LRU list 502 has finite size based upon the platform, GPU, and other constraints and could use 25 MB of memory, for example; other embodiments may use different memory space sizes for the LRU list. Therefore, operation of the GUI or other applications typically will eventually cause the LRU list 502 to fill, or approach a full state, at the time that a new surface needs to be added to the LRU list. Therefore, in an embodiment, surface caching logic 122 is configured to inspect the LRU list 502 in least recently used order to determine whether the list contains one or more old items having a size that is equivalent to the new surface to be added. For example, if the new surface to be added is 100×100 pixels, then the surface caching logic 122 searches the LRU list 502 until either an existing old 100×100 surface is found or one or more surfaces occupying total memory that exceeds 100×100 is found.

If the LRU list 502 contains a surface item that was not recently used and exactly matches the size of the new surface to be added, then the new surface to be added replaces the old item in the LRU list and associated metadata is updated. Therefore, previously allocated memory with a handle and assigned to the GPU may be re-used, reducing the need to inform and use the GPU to destroy a space and create a new space. For example, if a URL referencing BAR.png is received, and that image has the same dimensions as FOO.png, which is in the cache but not recently used, then the cache entry for FOO.png may be cleared and BAR.png may be rendered into a bitmap in the same memory previously allocated for FOO. In effect, the memory is pooled for use with multiple images without de-allocation or complex reclamation operations.

In some cases, the USED/UNUSED flag 510 of an LRU list item 504 may not accurately reflect the actual state of use of an item. This can occur, for example, when an application separate from the surface caching logic 122 requests the use of a surface, so that the surface is added to LRU list 502, but later updates the screen display so that the surface is not visible and does not inform the surface caching logic that the surface is effectively not in use. Therefore, in an embodiment, the surface caching logic 122 also is configured to query requesting applications and/or their data structures and/or supporting view systems to determine whether a particular surface actually is in use and to update the USED/UNUSED flag 510 and/or to purge a surface from the LRU list 502 if the querying determines that the surface is not actually in use by the application.

The network location 512 of an LRU list item 504 may be checked in response to an application requesting the retrieval, use or rendering of a particular graphic image in the application. For example, the surface caching logic 122 may be configured to receive requests from applications to display particular images, where the requests include a URL of a specified image. In response, surface caching logic 122 checks LRU list 502 based upon values of network location 512 of all items in the list, to determine if a network location value matches the URL requested by the application. If so, then the bitmap data 506 for the matching LRU list item may be used to satisfy the request of the application. If there is no match, then the surface caching logic 122 is configured to determine if a file matching the URL has been downloaded but not yet decoded and rendered. If so, then the surface caching logic 122 may initiate decoding and rendering the downloaded file to yield the bitmap data 506 and create a new LRU list item 504 subject to the reclamation policies and methods described above. However, if downloading has not occurred, then the surface caching logic 122 is configured to initiate a network transaction to download the file specified in the URL, decode the file, render the bitmap data 506, and create a new LRU list item 504 subject to the reclamation policies and methods described above.

In some embodiments, the reclamation processes described herein are performed only when the cache or LRU list has become nearly full, and not before.

Each file may be also associated with a lazy flag value. In this context, lazy operation refers to performing fewer than all, or none, of the operations involved in obtaining a graphical image file and presenting the graphical image on screen, including downloading, decoding, rendering, and causing displaying. If the lazy flag value is not set for a particular graphical image file, then in response to a request from an application to obtain the particular graphical image file, the surface caching logic 122 is configured to perform the downloading, decoding and rendering operations, even if the image is not in a visible location of the screen. Thereafter, if the application performs a scroll operation that causes the image to move to a visible location of the screen, the surface caching logic 122 may blit the previously rendered bitmap using the GPU immediately. In an embodiment, in response to a request of an application to use a particular graphical image file that is associated with a first lazy flag value, the surface caching logic 122 is configured to store a marker indicating that the particular graphical image file has been requested, without performing any of the downloading, decoding and rendering operations; thereafter, if the application performs a scroll operation that causes the image to move to a visible location of the screen, the surface caching logic 122 is configured to perform the downloading, decoding, rendering and blitting operations.

In an embodiment, in response to a request of an application to use a particular graphical image file that is associated with a second lazy flag value, the surface caching logic 122 is configured to download the specified file using a network transaction, store the file in the cache in original format without forming a surface, for example as a PNG file; thereafter, if the application performs a scroll operation that causes the image to move to a visible location of the screen, the surface caching logic 122 is configured to perform the decoding, rendering and blitting operations.

In some embodiments, images also may be associated with a hardware acceleration flag value with which an application mandates that GPU hardware acceleration is used to render an image. For example, in some embodiments the media player application 114 may request the rendering of a specified graphical image and may require GPU hardware acceleration for the rendering, as part of the request. This approach is appropriate when the media player application 114 is configured to display particular kinds of images or images of a particular size or location for which hardware acceleration is necessary to obtain a good user experience. In other words, including a mandate for hardware acceleration can provide improved performance when the media player application 114 is aware that the image to be displayed has a size or other characteristics for which hardware acceleration will be needed to provide appropriate performance.

These approaches effectively decouple the operations to download, decode, and render assets, such as visual content items, to enable efficiently selecting when to perform particular ones of the operations, unlike prior approaches in which all the operations are bound and required to be performed serially together. Decoupling the operations enables providing application developers with the ability to control how to use them by setting values of the lazy flag. The caching logic also enforces execution priority rules regardless of the lazy value; for example, rendering of visual content items that are known to be off-screen may be deferred even if the lazy value instructs immediate rendering, so that a finite number of decode operations, for example, is done at a time and the next operation is selected from a dynamically sorted list. Thus, for visual content items that are not visible on screen in the UI of the user device, the processes herein can defer rendering while the user device is idle, and resume rendering when the user resumes interacting with the device.

5. Image Display and Pre-Fetch Techniques

In an embodiment, a user interface application that displays a catalog of audiovisual program items may support forming user lists of titles that may include hundreds of items. In this environment, there may be insufficient memory and resources to load box art images for all the items in one or more user lists. Therefore, in an embodiment a viewport is configured that includes the visible screen area and regions just above and below the visible screen area. Gallery display logic is configured to fetch box art images only for audiovisual program items that are within the viewport, and is configured to pre-fetch box art images based on a schedule determined according to user interaction. For example, the gallery display logic loads and renders images for audiovisual program items that are in a user list but conceptually just outside the viewport, so that the user might scroll to those images in the near future. Further, embodiments are configured to reuse the same specified number of memory elements to hold or represent many more images by intelligently filling and replacing the memory elements with images according to a variety of policies. Prefetching may occur for both sides of the viewport (left and right) as well as for entire rows that are conceptually above or below the visible area of the viewport.

Figure 6:
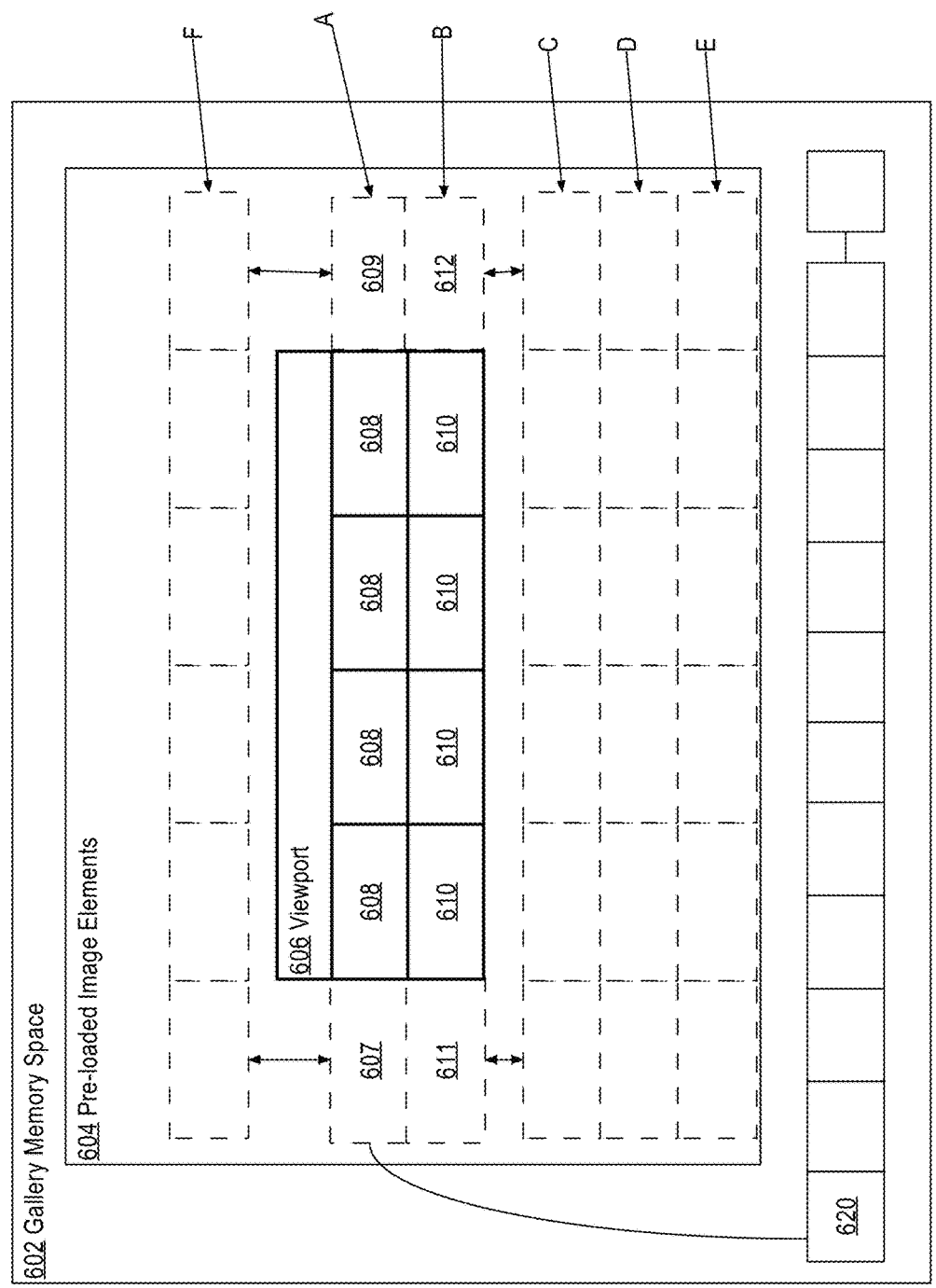
FIG. 6 illustrates a gallery memory space having sets of pre-loaded image elements and a viewport.
Figure 7:
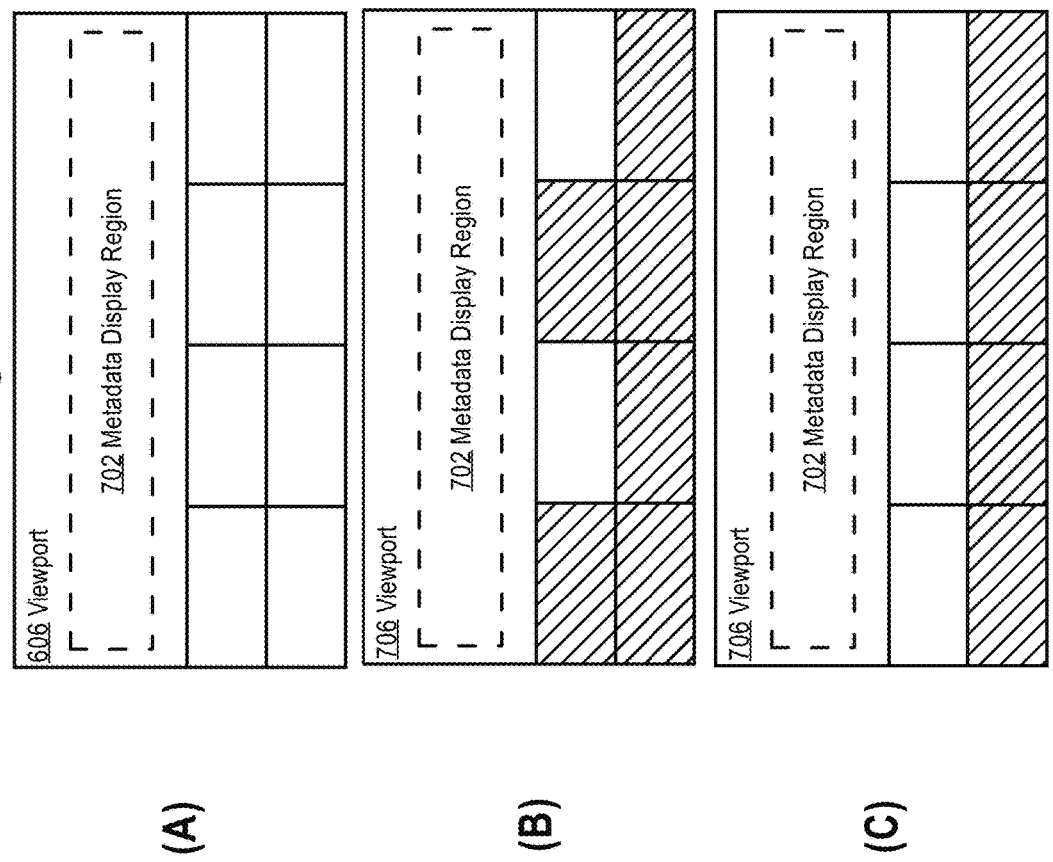
FIG. 7 is a three-part diagram that illustrates the viewport of FIG. 6 in states in which all image elements in visible rows are displayed, a first portion of image elements are undisplayed and represented by grayed-out polygons, and a second portion of image elements are undisplayed and represented by grayed-out polygons.

Embodiments are described with reference to FIG. 1, FIG. 6, FIG. 7. FIG. 6 illustrates a gallery memory space having sets of pre-loaded image elements and a viewport. While certain embodiments are described herein in the context of displaying box art images for movies or TV programs, the techniques described herein apply generally to collections of any kind of item. FIG. 7 is a three-part diagram that illustrates the viewport of FIG. 6 in states in which all image elements in visible rows are displayed, a first portion of image elements are undisplayed and represented by grayed-out polygons, and a second portion of image elements are undisplayed and represented by grayed-out polygons. As seen in FIG. 1, in an embodiment, in client computer 110 the media player application also may comprise gallery display logic 128 that is configured to perform the functions that are further described in this section and coupled to active image elements 168 in memory and associated with an image element pool 172.

Referring now to FIG. 6, in an embodiment, a gallery memory space 602 may comprise a set of pre-loaded image elements organized in a plurality of rows denoted A, B, C, D, E, F. Each row A, B, C, D, E, F comprises a finite number of image elements, such as image elements 607, 608, 609 in the case of row A and image elements 611, 610, 612 for row B. For purposes of illustrating a clear example, the embodiment of FIG. 6 includes six (6) rows A, B, C, D, E, F, but other embodiments may have any number of rows and the specific number of rows may be configurable in code that implements player application 114, in a profile associated with client computer 110, or in other configuration data. For example, there could be 15 rows. Similarly, for purposes of illustrating a clear example, the embodiment of FIG. 6 includes six (6) rows image elements in each of the rows A, B, C, D, E, F, but other embodiments may have any number of image elements per row and the specific number of image elements per row may be configurable in code that implements player application 114, in a profile associated with client computer 110, or in other configuration data. Thus, the size of pre-loaded image elements 604 in total may vary across different platforms.

Two rows A, B have some image elements 608, 610 within a viewport 606 that denotes a portion of the image elements and memory that are currently visible in the user interface of a media player application. For example, the gallery display logic 128 may be configured to generate a graphical user interface that includes a search box, GUI widgets configured to enable selection of display options, and a plurality of rows of box art images indicating audiovisual program items, where each of the rows is associated with a genre, type of list such as recent views or recommendations, or other metadata. These rows of box art images may be scrollable in response to user input of a pointing device or from touch-screen gestures that indicate moving a particular row left or right, or scrolling all visible rows up or down.

In such an example environment, when the media player application 114 and gallery display logic 128 initiate operation, rows A, B may be visible and therefore image elements 608, 610 are visible on the screen. All other rows C, D, E, F lie outside the viewport 606 that the gallery display logic 128 manages and therefore box art images of those rows are not visible on screen; moreover, image elements 607, 609, 611, 612 are outside the viewport and not visible, although the image elements are part of rows A, B that are partly visible. For purposes of illustrating a clear example, FIG. 6 shows only two image elements 607, 609 that are outside the viewport for row A and two image elements 611, 612 that are outside the viewport for row B; in embodiments, however, any number of such image elements may be within a row and outside the viewport. For example, a row A, B could consist of 20 image elements of which 10 are in the viewport 606 and 10 are outside the viewport. When operation of the application 114 initiates, the gallery display logic 128 requests one or more of the other logical elements of the application to fetch, download, and render those images that are in rows A, B, and to blit the images of image elements 608, 610 to cause displaying them on the screen.

Input indicating scrolling row A left or right may cause image elements 609 or 607 to enter the viewport 606 and become visible, respectively while dragging or gesturing row B left or right may cause image elements 612, 611 to become visible. Each of the rows A, B, C, D, E, F may be organized as a circular buffer. For example, an operation that moves row A to the left may result in moving image element 609 into the viewport so that is visible; continuing the same operation would cause moving image element 607 into the viewport at the next position to the right of image element 609, because in a circular buffer arrangement the image element 607 is logically adjacent to the right of element 609. Circular scrolling may be subject to constraints; for example, in one embodiment if a list or row comprises ten or fewer items, circular scrolling is not implemented and lateral scrolling of that row terminates at the last item to the left or right rather than wrapping around.

Input or touch gestures that indicate scrolling all rows down may result in moving row F into the viewport, moving row A down one position, and moving row B out of the view port and thus off screen. Alternatively input indicating scrolling all rows up may result in moving row A into the position of row F, moving row B up, and moving rows C, D, E upward into successively higher positions.

Figure 8:
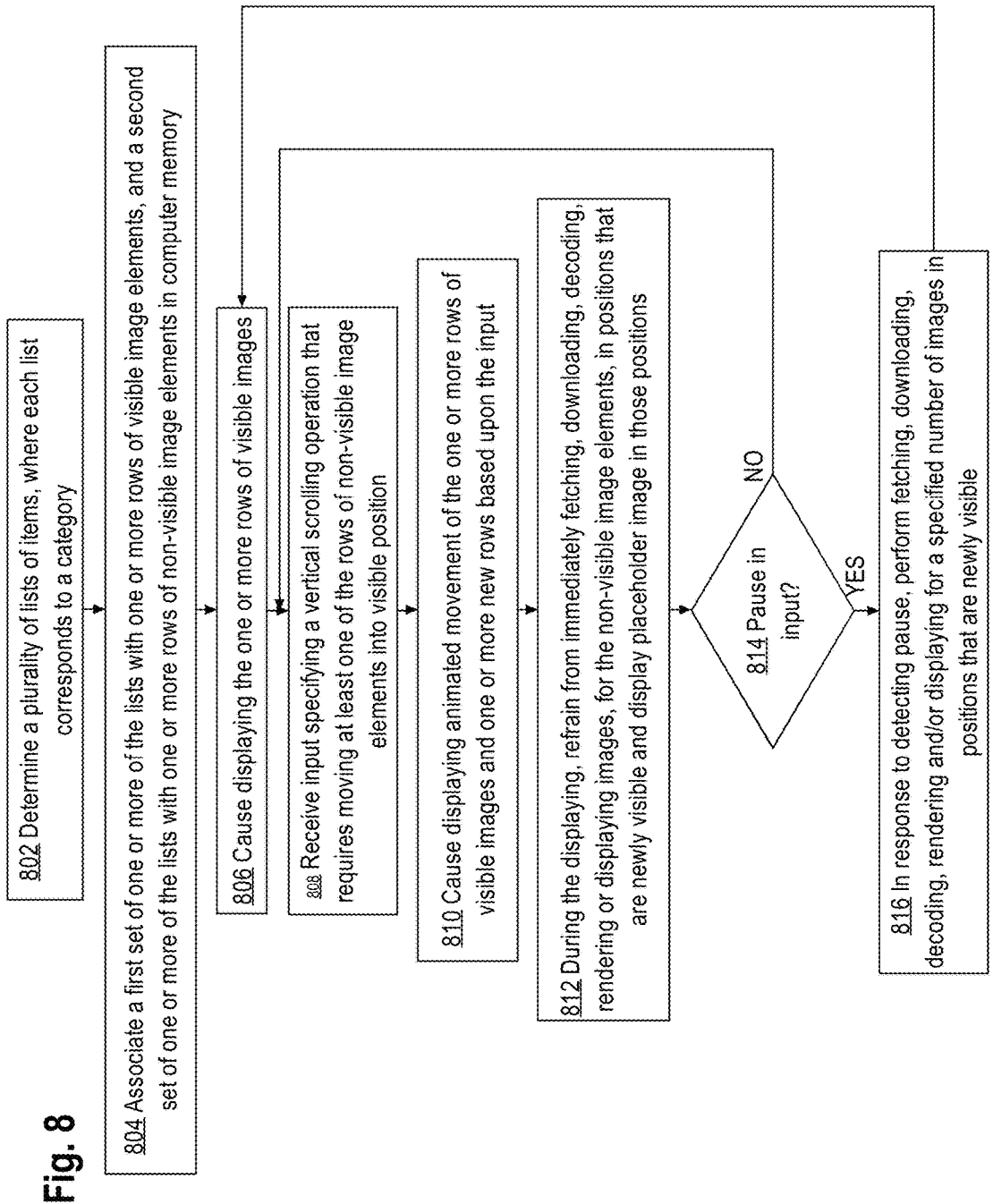
FIG. 8 illustrates a process of controlling the display of images in a graphical user interface display.
Figure 9:
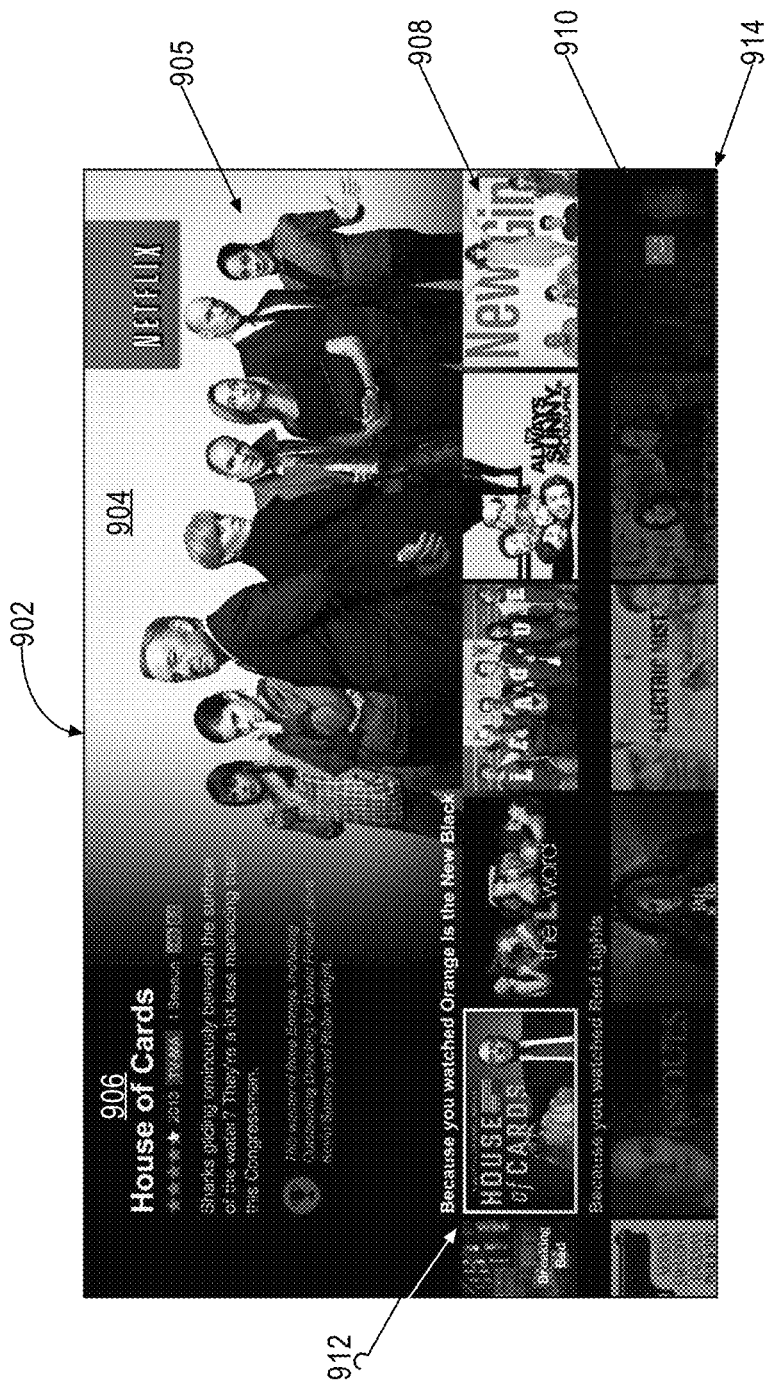
FIG. 9 illustrates an example graphical user interface with which the techniques of FIG. 8 may be used.

FIG. 8 illustrates a process of controlling the display of images in a graphical user interface display. FIG. 9 illustrates an example graphical user interface with which the techniques of FIG. 8 may be used.

At block 802, the process determines a plurality of lists of items; each list corresponds to a category. For example, in the context of the media player application 114, the process could establish a RECENTLY PLAYED list that includes all audiovisual programs that the then-currently logged-in user has recently played; a COMEDIES list that includes a plurality of audiovisual programs in the media catalog 103 that are in the genre COMEDIES; and other lists as appropriate for the application, user or context. The plurality of lists typically is established in main memory of the client computer 110, and the row structure 620 as described further below may be used as a mechanism for storing and managing one of the lists.

At block 804, the process associates a first set of one or more of the lists with one or more rows of at least some visible image elements that are stored in computer memory, and also associates a second set of one or more of the lists with one or more rows of non-visible image elements in computer memory. For example two (2) rows may be associated with at least some visible image elements that are within a viewport as well as image elements that are just outside the viewport and in the same row, whereas a second set of lists may be completely outside the viewport and associated with stored image elements in non-visible locations. As a result, some of the lists that were established at block 802 are associated with entirely non-visible image elements and rows, while others are associated with rows of image elements that are at least partly within the viewport and visible.

At block 806, the process displays one or more rows of visible images. For example, block 806 may represent initial execution of a media player application, gallery viewing application, or other application that presents rows of digital graphical images, where the application is configured to enable each of the rows to be scrolled left or right, and to enable all the rows to be scrolled up or down.

At block 808, the process receives input specifying a vertical scrolling operation that requires moving at least one of the rows of non-visible image elements into visible position. For example, touch gesture input, cursor control input, mouse input or other input is received indicating scrolling a set of rows or the entire screen display up or down. The input also may be for moving a particular row left or right so that certain non-visible image elements of that row are moved into the viewport.

At block 810, the process causes displaying animated movement of the one or more rows of visible images and one or more new rows based upon the input. For example, referring again to FIG. 6, FIG. 7, block 810 comprises causing animated movement of rows A, B upward and causing animated movement of rows C, D upward so that at least row C enters the viewport 606. However, as seen at block 812, during the displaying, the process refrains from immediately fetching, downloading, decoding, rendering or displaying images in positions that are newly visible, and displays a placeholder image in those positions. The placeholder image may be, for example, a gray box, a transparent blank box, a black box, etc. As seen in FIG. 7 view (B) and view (C) for example, performing block 810, 812 may result in displaying one or more rows in which at least one or more graphical images are represented by the placeholder images and actual images, such as box art, are not shown.

At block 814, a test is performed to determine whether the scrolling input has paused. If not, then control returns to block 808. The loop of block 814 to 808 represents repeatedly receiving vertical scrolling input over a period of time. For example, a looping operation may be associated with a user rapidly scrolling the screen or using repeated generally vertical touch gestures, trackball input indicating a vertical direction, thumbwheel input on a mouse indicating vertical scrolling, etc.

At block 816, if the test of block 814 is positive, then in response to the pause that has been detected, the process performs the fetching, downloading, decoding, rendering and/or displaying for a specified number of the images that are in positions that are newly visible. As suggested by the term "and/or," one or more such operations may have been performed previously as part of the surface atlasing and/or surface caching techniques that have been previously described. Further, block 816 may include fetching metadata, and not just image data, associated with images; metadata may include, for example, an image name or title, synopses or other descriptive information about an audiovisual program that is represented in the image, location identifiers such as URLs for box art images, date-time information, etc. Thus, block 816 broadly represents performing whatever image retrieval, decoding, rendering or displaying operations that are needed to cause obtaining and displaying on the screen an image corresponding to an image display element that has moved into the viewport 606 with any associated metadata that may be useful to the application or needed for display.

After block 816, control may return to block 806 or 808; the loop from block 816 to 806, 808 generally indicates that operation of the process may be continuous and may respond to scrolling input or pausing as they occur. An infinite loop is not implied and when the process of FIG. 8 is integrated into a larger application the application may provide escape controls such as features, functions, or exit controls that result in departing from FIG. 8 and performing other operations. For example, it is possible that after one iteration of the process of FIG. 8, there may be no input at block 808 and therefore the process may suspend or terminate until such time as scrolling input is received.

As a result, a progressive approach is provided in which rapid scrolling of rows of items does not mandate rendering and displaying those items but instead placeholder images, or no images, may be displayed until such time as a pause in scrolling occurs; in response to detecting the pause, images for items are then displayed, with any downloading, decoding or rendering operations then performed as needed. Various techniques may be used to detect a pause in input that indicates scrolling, based upon the hardware platform of client computer 110, operating system 118, or other machine or software characteristics. In one embodiment, the gallery display logic 128 may subscribe to KEY DOWN and KEY UP events that are published by the operating system 118 or components such as device drivers, and the gallery display logic may determine whether a time interval between successive KEY DOWN and KEY UP events is long enough to indicate a pause. Typical pause time might be 0.5 seconds, but may vary in different embodiments and the particular time used to detect a pause in scrolling is not critical.

The specified number of images may be a configurable value that may vary according to the hardware platform on which client computer 110 is based; an example specified value is fifteen but other embodiments or platforms may use smaller values such as ten or higher values according to the anticipated or known performance characteristics of the hardware platform. In an embodiment, the application 114 may define and store metadata for tiers of performance classes and each of the performance classes may store a particular value for the number of graphical images to load when a pause occurs.

It will be apparent that the present approach defers performing computationally expensive operations for graphical images until a pause in scrolling input occurs. This approach has the benefit of efficiently supporting applications in which user action to scroll the display may cause movement across the screen of dozens or hundreds of rows of images that are never within the viewport 606 long enough to be seen or focused upon by the user. In other words, using conventional approaches, the computational time needed to render many rows of images that move rapidly through the viewport, either as those images enter the viewport or on a look-ahead basis just before those images enter the viewport, would be wasted. Instead, with the present approaches, network transactions and GPU operations are performed only when the user has paused in scrolling and thus indicated an interest in actually seeing the images rather than merely moving them across the screen without viewing them. Still another benefit of the present approach is reduction in GPU and/or CPU contention that would otherwise arise if a large number of network transactions were required to download images for image elements that are only transiently within the viewport 606.

While FIG. 8 and the preceding description has involved vertical scrolling of entire sets of rows, the same process steps may be used when input indicates or requests the horizontal scrolling of a single row, or a group of rows. In some embodiments, for the purpose of ensuring a good user experience, the pre-loaded image elements 604 of FIG. 6 includes a relatively small number of rows but each row is defined to have a relatively large number of image elements, such as fifteen to fifty image elements. In other words, the application 114 and gallery display logic 128 may be configured to support storing a relatively smaller number of rows in which each row has a relatively larger number of images.

With this architecture, pre-fetching operations may be used to fetch metadata for some or all of the non-visible image elements in a particular row that is visible in viewport 606. For example, for rows A, B of FIG. 6, gallery display logic 128 may be configured to pre-fetch metadata for all image elements of rows A, B, even those image elements that are outside the viewport 606. This process reflects the recognition that when a particular row A, B has been paused and is visible in the viewport 606, the user is likely to scroll that row left or right relatively slowly, in order to inspect and evaluate many more (or all) images in the row, and therefore pre-fetching all such images will result in the best user experience by ensuring the ability to rapidly display images as soon as scrolling input occurs. In contrast, vertical scrolling tends to involve rapid operations as users quickly scan through numerous categories, such as genres, to find particular rows that might contain items of interest.

In an embodiment, the number of image elements that are used to store rendered textures for box art or other graphic image information typically is relatively small, and smaller than the total number of items in a row for which metadata may be pre-fetched. For example, in one embodiment the media player application 114 could define each row A, B, C, D, E, F as a circular list of 75 items, and could specify which audiovisual program item is in each entry of the circular list. For each row, the media player application 114 could manage a row structure 620 in gallery memory space 602 that contains 75 items as seen in the example of FIG. 6. The media player application 114 may define a metadata label for the row structure 620, such as "Action/Adventure Movies," and may determine which items in the media catalog 103 are associated with that metadata label. Accordingly, the media player application 114 may cause pre-fetching metadata for each audiovisual program item for each entry of the row structure 620. Since the metadata typically comprises a URL pointing to box art, title, and descriptive information, the dataset for the entire row structure 620 is relatively compact.

Thus in one embodiment, a row structure 620 may be associated with a list of movies or programs. In addition, there may be any number of row structures 620 each associated with a different list of movies or programs, and references to all such row structures may be stored in a "list of list of movies" or LOLOMO that serves as a reference for determining which row A, B, C, D, E, F should be displayed next and to locate metadata relating to that row. Each list in a LOLOMO may vary in length.

Each row structure 620 is associated with a corresponding row of the image elements, such as row A in the example of FIG. 6, having fewer image elements 607, 608, 609 such as ten to twenty elements. With this structure, when any part of a particular row A enters the viewport 606, the gallery display logic 128 may cause pre-fetching metadata for image elements 607, 608, 609 from the row structure 620, and may also download, decode, and render images for those image elements. As a result, at least ten to twenty images will be capable of immediate display in response to user input indicating a horizontal scrolling operation. As scrolling operations occur and at least one of the image elements 608 moves out of the viewport, that non-visible image element may be replaced with another downloaded, decoded and rendered image. In other words, the relatively small number of image elements may be updated with newly visible—or soon-to-be-visible—graphic images while the row structure 620 holds metadata for all audiovisual program items that are associated with a category or other row label.

In one embodiment, the player application 114 may define the viewport 606 as larger than the area of a computer screen that is known to be actually visible to a user. For example, the player application 114 may obtain known dimension data for a particular client computer 110 from stored device profiles for categories of devices that are maintained at application server computer 102, and then the viewport 606 could be defined as several hundred pixels larger in the vertical and horizontal dimensions than the actual screen of the client computer. For image elements 607, 609, 611, 612 that lie outside the visible screen area, the player application 114 may set the lazy flag value described herein to require downloading and decoding when items are in the row structure 620 and assigned to one of those image elements; with this approach, the player application can cause the gallery display logic 128 and/or image pre-fetch logic 126 to pre-fetch images for those image elements that lie outside the visible screen area so that those image elements are ready for display in response to a scroll operation. Further, for image elements in rows C, D, E, F that are far outside the viewport, the player application 114 may set the lazy flag value to require either no action, or downloading, or downloading plus decoding, based upon the relative distance of those rows from the bounds of the viewport.

The techniques described herein may be applied in the context of a graphical user interface of the type seen in FIG. 9. In this example, a screen display 902 comprises a metadata region 904 having text metadata 906 and a billboard image 905. The text metadata 906 may include title, rating, season, summary, and other information about a particular audiovisual program, and the billboard image 905 may relate to that item. Screen display 902 further comprises two (2) horizontally and vertically scrollable rows 908, 910 each comprising a plurality of box art images 912, 914 that are displayed as consistently sized polygons within a row. Each row 908, 910 is associated with a category label, such as BECAUSE YOU WATCHED ORANGE IS THE NEW BLACK or BECAUSE YOU WATCHED RED LIGHTS. Any other appropriate category labels for lists, genres or other categories may be used and those in FIG. 9 are merely examples.

In an embodiment, box art image 912 is selected as indicated by a distinctive border, and the metadata region 904 displays data that corresponds to the selected box art image. All other box art images in row 908 may be scrolled left or right as a unit in response to input indicating lateral movement in a particular horizontal direction. Similarly, rows 908, 910 may be vertically scrolled in the display, without affecting the size or appearance of metadata region 904, in response to input indicating lateral movement in a particular vertical direction.

Box art image 914 comprises a placeholder. For purposes of illustrating an example, assume that row 910 was recently rapidly scrolled into view in response to user input; in this situation, the application 114 may have deferred rendering box art image 914 according to the techniques of FIG. 8, but in response to a pause that causes row 910 to rest in the visible region of the screen, box art image 914 will be rendered or, if needed, downloaded and decoded.

In some embodiments, the hardware platform associated with client computer 110 may support scrolling operations in which a single input signal may indicate scrolling by a plurality of items. For example, with some hardware platforms, a single left-cursor signal or left-movement signal might actually signify moving left by four (4) image elements rather than just one. The embodiments described thus far effectively support operations of these hardware platforms by ensuring that a sufficient number of image elements have been pre-fetched for a row to support a multiple-element lateral scroll operation; in other words, enough image elements are ready and rendered to permit effective use of a multiple-element operation.

In an embodiment, the number of image elements 607, 608, 609 to pre-fetch for a particular row A may be determined based upon heuristics or dynamically changed configurable values that are based upon observations of actions of a plurality of client computers 110, 130, 140 or one particular client computer. For example, the player application 114 and/or the gallery display logic 128 may determine that users most commonly scroll a particular row A, B to the left in order to see image elements 609, 612 that are offscreen to the right, rather than first scrolling to the right or regularly scrolling to the right. Based on such observations, the player application 114 and/or the gallery display logic 128 may establish configuration data that requires pre-fetching a larger number of image elements for the right ends of rows A, B rather than the left ends, or may define the viewport 606 in a manner that is biased toward one end of the rows A, B, C, D, E, F. Feedback signals indicating user actions at client computers 110, 130, 140 during interactions with the player application 114 may be obtained from operating system primitives of the operating system 118.

6. Example Implementation Mechanism—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 10:
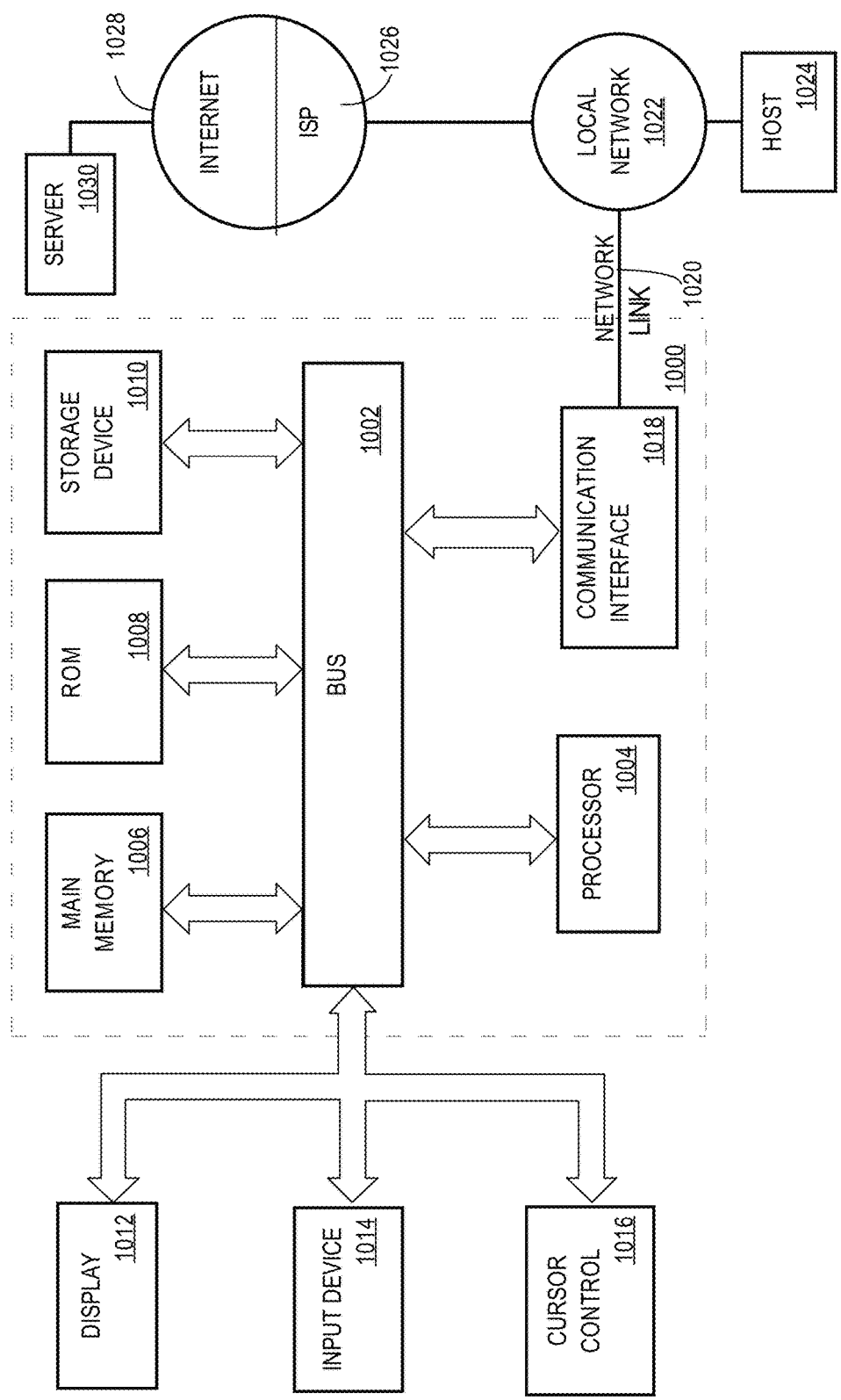
FIG. 10 illustrates a computer system with which an embodiment may be implemented.

For example, FIG. 10 is a block diagram that illustrates a computer system 1000 upon which an embodiment of the invention may be implemented. Computer system 1000 includes a bus 1002 or other communication mechanism for communicating information, and a hardware processor 1004 coupled with bus 1002 for processing information. Hardware processor 1004 may be, for example, a general purpose microprocessor.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk or optical disk, is provided and coupled to bus 1002 for storing information and instructions.

Computer system 1000 may be coupled via bus 1002 to a display 1012, such as a cathode ray tube (CRT), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution.

Embodiments further include the subject matter of the following numbered clauses:

38. A computer system providing an improvement in efficient use of computer memory and comprising: a first computer comprising one or more non-transitory computer-readable data storage media stored with one or more sequences of instructions that are arranged, when executed using a second computer among a plurality of other computers, to cause the second computer to perform: using a computer, creating in computer memory a glyph memory area that is configured to store a plurality of cached glyphs; using the computer, receiving a request from an application to use a particular glyph; in response to the request, determining whether the particular glyph is in the glyph memory area; in response to determining that the particular glyph is not in the glyph memory area: attempting to store a bitmap of the particular glyph to a next location in the glyph memory area; in response to determining that the next location is not available a first time, reclaiming space in the glyph memory area in an amount sufficient to store the bitmap; attempting a second time to store the bitmap in the next location in the glyph memory area; in response to determining that the next location is not available a second time, clearing the glyph memory area of all previously stored glyphs and storing the bitmap in the glyph memory area; in the first computer, stored downloading instructions which, when executed using the first computer, cause downloading a copy of the one or more sequences of instructions to any of the other computers.

39. The computer system of clause 38, wherein the one or more sequences of instructions comprise instructions that are arranged to cause the second computer to perform, after determining that the next location is not available the second time, clearing the glyph memory area and storing the bitmap in the glyph memory area, performing one or more graphics operations using the particular glyph that relate to causing displaying the particular glyph on a computer display screen of the computer.

40. The computer system of clauses 39, wherein the one or more sequences of instructions comprise instructions that are arranged to cause the second computer to perform, performing a single GPU function call that specifies a single source to use in a plurality of operations with multiple glyphs that are in the glyph memory area.

41. The computer system of clause 38, wherein the one or more sequences of instructions comprise instructions that are arranged to cause the second computer to perform, creating, in the computer memory, geometry data comprising a plurality of glyph items, wherein each of the glyph items comprises a plurality of metadata values that define a specific glyph and is keyed to a key value; a usage index coupled to the glyph memory area and configured to store usage values indicating which parts of the glyph memory area are in use.

42. The computer system of clause 38, wherein the one or more sequences of instructions comprise instructions that are arranged to cause the second computer to perform, testing whether the glyph memory area can accept the particular glyph by comparing a width value and a height value of the particular glyph to other width values and other height values of two or more other glyphs that were most recently added to the glyph memory area.

43. The computer system of clause 38 wherein the determining, attempting, reclaiming, clearing and storing are performed only in response to receiving the request and the glyph memory area is constructed and maintained dynamically in response to requests of applications to display glyphs and not in advance of all such requests.

44. A computer system providing an improvement in efficient use of computer memory and comprising: a first computer comprising one or more non-transitory computer-readable data storage media stored with one or more sequences of instructions that are arranged, when executed using a second computer among a plurality of other computers, to cause the second computer to perform: using a computer, creating in computer memory a memory space that is configured to store a plurality of visual content items in one or more atlases of visual content items, each atlas having a configured memory size; using the computer, declaring a particular plurality of visual content items from the plurality of visual content items a part of a particular atlas of the one or more atlases; using the computer, receiving a request from an application to display a row of visual content items on a screen of the computer; using the computer, determining that the row of visual content items includes one or more visual content items of the particular atlas; using the computer, in response to receiving the request, performing a visual content processing operation by accessing, in a batch, a plurality of bitmaps corresponding to the particular atlas.

45. The computer system of clause 44, wherein the visual content processing operation includes writing in a batch the plurality of bitmaps to the screen of the computer.

46. The computer system of clause 44, wherein the particular atlas corresponds to visible visual content items of the row of visual content items displayed on the screen of the computer.

47. The computer system of clause 46, wherein the one or more sequences of instructions comprise instructions that are arranged to cause the second computer to perform: receiving an indication from the application that an additional visual content item is requested to be visible in the row of visual content items; in response to receiving an indication, determining whether assigning the additional visual content item to the particular atlas would exceed a configured size of the particular atlas; in response to determining that assigning the additional visual content item to the particular atlas would not exceed the configured size of the particular atlas, assigning the additional visual content item to the particular atlas.

48. The computer system of clause 44, wherein the one or more sequences of instructions comprise instructions that are arranged to cause the second computer to perform: maintaining, as part of the memory space, a least recently used (LRU) list of visual content items, each entry in the LRU list ordered relative to other entries in the LRU list based on a contemporariness of last usage of a corresponding visual content item of said each entry and storing at least metadata for the corresponding visual content item that includes a network location of the corresponding visual content item; in response to receiving a request from the application for a visual content item, determining whether a network location specified in the request matches a network location of a visual content item in the LRU list; in response to determining that the network location specified in the request matches a network location of a specific visual content item in the LRU list: satisfying the request from the application for the visual content item using a specific LRU entry corresponding to the specific visual content item, and updating a usage flag in metadata of the specific visual content item to indicate that the specific content item is in use by the application.

49. The computer system of clause 48, wherein the one or more sequences of instructions comprise instructions that are arranged to cause the second computer to perform, in response to determining that the network location specified in the request matches the network location of the specific visual content item in the LRU list: determining that the specific visual content item is non-visible on the screen of the computer, and the request for the visual content item requests the specific visual content item to be visible on the screen of the computer; based on metadata of the specific visual content item, performing one or more of: downloading, decoding and rendering of the specific visual content item.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A data processing method providing an improvement in efficient use of computer memory and comprising:
   using a computer, creating in computer memory a glyph memory area that is configured to store a plurality of cached glyphs;
   using the computer, receiving a request from an application to use a particular glyph;
   in response to the request, determining whether the particular glyph is in the glyph memory area; and in response to determining that the particular glyph is not in the glyph memory area:
    attempting to store a bitmap of the particular glyph to a next location in the glyph memory area;
    in response to the next location being unavailable for a first attempt to store the bitmap to the next location, reclaiming space in the glyph memory area in an amount sufficient to store the bitmap;
    attempting a second time to store the bitmap in the next location in the glyph memory area; and
    in response to the next location being unavailable for at least two attempts to store the bitmap to the next location, clearing the glyph memory area of all previously stored glyphs and storing the bitmap in the glyph memory area.

2. The method of claim 1, further comprising, after receiving the request from the application to use the particular glyph and determining that the particular glyph is not in the glyph memory area, transforming glyph vector data for the glyph to the bitmap.

3. The method of claim 1, further comprising, in response to the next location being unavailable for at least two attempts to store the bitmap to the next location, performing one or more graphics operations using the particular glyph that relate to causing displaying the particular glyph on a computer display screen of the computer.

4. The method of claim 3, further comprising performing a single GPU function call that specifies a single source to use in a plurality of operations with multiple glyphs that are in the glyph memory area.

5. The method of claim 1, further comprising creating, in the computer memory, geometry data comprising a plurality of glyph items, wherein each of the glyph items comprises a plurality of metadata values that define a specific glyph and is keyed to a key value; a usage index coupled to the glyph memory area and configured to store usage values indicating which parts of the glyph memory area are in use.

6. The method of claim 5, further comprising creating, in the computer memory, a vertex buffer that is coupled to glyph caching logic that is coupled to the glyph memory area and the geometry data, wherein the vertex buffer comprises a plurality of location data for glyphs that are expected to be reused.

7. The method of claim 1, wherein one or more specific cached glyphs among the plurality of cached glyphs occupies a region of the glyph memory area having a different size.

8. The method of claim 1, further comprising testing whether the glyph memory area can accept the particular glyph by comparing a width value and a height value of the particular glyph to other width values and other height values of two or more other glyphs that were most recently added to the glyph memory area.

9. The method of claim 8, wherein the testing includes leaving a 1-pixel gap between adjacent glyphs.

10. The method of claim 1, wherein the reclaiming comprises performing defragmentation of the glyph memory area by rewriting a plurality of glyphs into new positions in the glyph memory area that have become available after removal of unused glyphs.

11. The method of claim 1, further comprising determining that the particular glyph is to be rendered using a visible outline, and in response, storing the particular glyph, associated with a character, in a position in the glyph memory area that is separate from another glyph associated with an outline of the character.

12. The method of claim 1, wherein the determining, attempting, reclaiming, clearing and storing are performed only in response to receiving the request and the glyph memory area is constructed and maintained dynamically in response to requests of applications to display glyphs and not in advance of all such requests.

13. A non-transitory computer readable medium storing instructions that, when executed by a processor, cause the processor to provide an improvement in efficient use of computer memory by performing the steps of:
    creating in computer memory a glyph memory area that is configured to store a plurality of cached glyphs;
    receiving a request from an application to use a particular glyph;
    in response to the request, determining whether the particular glyph is in the glyph memory area; and
    in response to determining that the particular glyph is not in the glyph memory area:
        attempting to store a bitmap of the particular glyph to a next location in the glyph memory area;
        in response to the next location being unavailable for a first attempt to store the bitmap to the next location, reclaiming space in the glyph memory area in an amount sufficient to store the bitmap;
        attempting a second time to store the bitmap in the next location in the glyph memory area; and
        in response to the next location being unavailable for at least two attempts to store the bitmap to the next location, clearing the glyph memory area of all previously stored glyphs and storing the bitmap in the glyph memory area.

14. The non-transitory computer readable medium of claim 13, further comprising, after receiving the request from the application to use the particular glyph and determining that the particular glyph is not in the glyph memory area, transforming glyph vector data for the glyph to the bitmap.

15. The non-transitory computer readable medium of claim 13, further comprising, after determining that the next location is not available the second time, clearing the glyph memory area and storing the bitmap in the glyph memory area, performing one or more graphics operations using the particular glyph that relate to causing displaying the particular glyph on a computer display screen of the computer.

16. The non-transitory computer readable medium of claim 15, further comprising performing a single GPU function call that specifies a single source to use in a plurality of operations with multiple glyphs that are in the glyph memory area.

17. A computer system, comprising:
a memory storing instructions; and
a processor configured to execute the instructions to perform the steps of:
    creating in computer memory a glyph memory area that is configured to store a plurality of cached glyphs;
    receiving a request from an application to use a particular glyph;
    in response to the request, determining whether the particular glyph is in the glyph memory area; and
    in response to determining that the particular glyph is not in the glyph memory area:
        attempting to store a bitmap of the particular glyph to a next location in the glyph memory area;
        in response to the next location being unavailable for a first attempt to store the bitmap to the next location, reclaiming space in the glyph memory area in an amount sufficient to store the bitmap;

attempting a second time to store the bitmap in the next location in the glyph memory area; and in response to the next location being unavailable for at least two attempts to store the bitmap to the next location, clearing the glyph memory area of all previously stored glyphs and storing the bitmap in the glyph memory area.

18. The computer system of claim 17, wherein the processor is further configured to perform the step of, after receiving the request from the application to use the particular glyph and determining that the particular glyph is not in the glyph memory area, transforming glyph vector data for the glyph to the bitmap.

* * * * *